US008547961B2

(12) United States Patent
Riley et al.

(10) Patent No.: US 8,547,961 B2
(45) Date of Patent: Oct. 1, 2013

(54) POLICY-BASED NETWORK-INITIATED SECONDARY DATALINK FLOWS WITH QUALITY-OF-SERVICE IN CELLULAR PACKET DATA NETWORKS

(75) Inventors: Yusun Kim Riley, Marlborough, MA (US); Bruce Perlmutter, Boston, MA (US); Randy Fuller, Wellesley, MA (US)

(73) Assignee: Camiant, Inc., Marlborough, MA (US)

( * ) Notice: Subject to any disclaimer, the term of this patent is extended or adjusted under 35 U.S.C. 154(b) by 1045 days.

(21) Appl. No.: 11/312,246

(22) Filed: Dec. 20, 2005

(65) Prior Publication Data

US 2007/0036145 A1    Feb. 15, 2007

Related U.S. Application Data

(60) Provisional application No. 60/708,547, filed on Aug. 15, 2005.

(51) Int. Cl.
*H04L 12/66* (2006.01)
*H04J 1/16* (2006.01)
*H04L 12/28* (2006.01)

(52) U.S. Cl.
USPC ....... 370/352; 370/235; 370/236; 370/395.21

(58) Field of Classification Search
USPC ................................................ 370/338, 351
See application file for complete search history.

(56) References Cited

U.S. PATENT DOCUMENTS

| | | | |
|---|---|---|---|
| 6,798,757 B2 * | 9/2004 | Mizutani et al. | 370/329 |
| 2001/0026553 A1 | 10/2001 | Gallant et al. | |
| 2002/0062379 A1 * | 5/2002 | Widegren et al. | 709/227 |
| 2004/0125748 A1 * | 7/2004 | Hurtta et al. | 370/230 |
| 2004/0177247 A1 | 9/2004 | Peles | |
| 2004/0223602 A1 * | 11/2004 | Honkasalo et al. | 379/243 |

OTHER PUBLICATIONS

Communication pursuant to Article 94(3) EPC for European Patent No. 1915700 (Apr. 19, 2010).
Examiner's Report for Australian Application No. 2005335495 (Nov. 25, 2010).
Extended European Search Report for European Patent No. 1915700 (Dec. 11, 2009).
Communication of European publication number and information on the application of Article 67(3) EPC for European Application No. 05854798.5 (Apr. 2, 2008).
First Office Action for Canadian Application No. 2,618,023 (Dec. 28, 2012).
International Search Report for International Application No. PCT/US05/46142 (May 17, 2007).
Written Opinion of the International Searching Authority for International Application No. PCT/US05/46142 (May 17, 2007).

* cited by examiner

*Primary Examiner* — Huy C Ho
(74) *Attorney, Agent, or Firm* — Jenkins, Wilson, Taylor & Hunt, P.A.

(57) ABSTRACT

A method of creating a network-initiated secondary packet data service instance includes sending a content request for application data from a mobile station to an application function through an access network. The method further includes sending a request for a secondary packet data service instance from the application function to a policy function, and evaluating the request for a secondary packet data service instance and determining one or more operational attributes from the evaluation. The method also includes creating the secondary packet data service instance between the application function to the mobile station by arranging one or more network components as a function of the one or more operational attributes. The method further includes transmitting the application data from the application function to the mobile station via the secondary packet data service instance.

22 Claims, 4 Drawing Sheets

POLICY-BASED NETWORK-INITIATED SECONDARY DATALINK FLOWS WITH QUALITY-OF-SERVICE IN CELLULAR PACKET DATA NETWORKS

CROSS REFERENCE TO RELATED APPLICATIONS

This application claims benefit of the following Patent Applications: U.S. Provisional Patent Application Ser. No. 60/708,547, filed Aug. 15, 2005.

TECHNICAL FIELD

This invention relates generally to policy-based network resource management.

BACKGROUND OF THE INVENTION

Communications between end-points on an Internet Protocol (IP) network can be characterized as traffic flows. A traffic flow is a stream of packets that share specific instantiation of Internet Engineering Task Force (IETF) protocol layers. For example, a Real Time Protocol (RTP) flow may consist of the packets of an RTP/UDP/IP protocol instantiation, all of which share the same source and destination IP addresses and UDP port numbers.

Some network architectures permit a network connection with a single IP address to contain multiple datalink flows. Each datalink flow is referred to herein as a "packet data service instance." In this case, there is a main packet data service instance that is setup when the network connection is established and an IP address is assigned to the end-point, and one or more packet data service instance that can be established and released at a later time.

Each packet data service instance can have differing datalink operational parameters, and implement different Quality-of-Service (QoS) treatments for the traffic flows, so that each particular packet data service instance is associated with its own specific QoS. A traffic classifier on the data-link endpoints is used to direct specific traffic flows onto specific datalink flows.

Network architectures that are structured this way include cellular packet data networks based on CDMA2000, including EV-DO Revision A, (E)GPRS, and UMTS, among others.

Multiple packet data service instances with different operational parameters are sometimes necessary because of unique requirements associated with each application making use of the packet data service instance. For example, packet latency issues do not adversely affect a web-browsing application, so such an application can accommodate a flow with a lower QoS. A Voice over IP (VoIP) application cannot tolerate a datalink flow with significant packet latency, so such an application requires a higher QoS.

FIG. 1 illustrates an example of three packet data service instances and shows the relationships between a mobile station (MS) IP addresses, the (Point-to-Point Protocol Datalink) PPP session, R-P session (Radio Access Network (RAN) to Packet Data Serving Node), R-P connections, service instances, and Service Reference ID (SR_ID) in the CDMA2000 architecture.

At least some of the Cellular Packet Data Network architectures mentioned above currently have procedures available for the network to initiate a primary packet data service instance. For example, if a mobile station is not attached to the network (i.e., the mobile station does not yet have an IP address), and a server on the network wants to send data to the mobile station, the server cannot send IP data until an IP connection is established and the mobile station obtains an IP address. However, the network itself can establish IP connection with the mobile station via a network-initiated procedure. This is in contrast to the usual mode of operation, where the Mobile Station initiates the IP connection and is thereby assigned an IP address.

Although such procedures exist to establish a network initiated main packet data service instance, these procedures are not implemented in practice because of the administrative and addressing problems that occur in this mode of operation. For example, mobile stations capable of network-initiated operation may require a statically assigned IP address.

Procedures for network initiation of secondary packet data service instances are not defined in the standards for the above-mentioned Cellular Packet Data Network architectures. This is because those standards assume that for secondary packet data service instances, the end node (i.e., the mobile station) is already attached to the network and itself will decide based on application requirement when to initiate required secondary packet data service instances. However, the administrative and addressing problems that occur when creating a network-initiated connection to an unattached station are not an issue when establishing secondary packet data service instances because the mobile station already has an IP address, and active signaling channels are established between the mobile and network.

With the rise of interest IP Multimedia networking, online gaming, and protocols such as the Session Initialization Protocol (SIP), network-initiated secondary packet data service instances (such as for CDMA2000 Service Instances or (E)GPRS PDP contexts) can be very useful, in that they provide a secure, authorized, and billable way to establish packet data service instances media, gaming, or other traffic flows that require special QoS handling on the network.

SUMMARY OF THE INVENTION

This disclosure describes mechanisms for a network to initiate policy-based secondary packet data service instances with particular operational parameters, in particular specific Quality-of-Service level. The mechanisms currently standardized for the 3GPP IP Multimedia System and cellular packet data networks referred to herein as "pull models," since such mechanisms rely on software and procedures on the client device (i.e., the mobile station) to initiate secondary packet data service instances, along with the datalink operational and Quality-of-Service attributes of those packet data service instances. The approach described herein is referred to as a "push model," since a higher-level intelligence within the network itself decides the datalink operational and Quality-of-Service attributes and "pushes" or initiates the new secondary packet data service instance to the mobile station.

In one aspect, the invention is a system for creating a network-initiated secondary packet data service instance includes an access network for connecting one or more network components, and a mobile station in communication with the access network through a wireless connection. The mobile station has an assigned IP address. The system further includes an application function for providing content to an application operating on the mobile station. The application server is capable of communicating through the access network. The system also includes a policy enforcing function for managing network resources used for communication between the application server and the mobile station. The policy enforcing function responds to a request from the application function to establish a secondary packet data service instance.

In one embodiment, the application function is an application server. In another embodiment, the policy enforcing function is a policy server. The wireless connection may include a radio access network and a broadband remote access server, including a gateway GPRS serving node and a serving GPRS serving node.

In one embodiment, the policy enforcing function manages network resources to create a secondary packet data instance on behalf of the application function. In another embodiment, the secondary packet data service instance is characterized by a predetermined quality of service level. The policy decision function evaluates the request from the application server and requests the creation of the secondary packet data instance based on at one or more parameters relating to the mobile station, the application function, and the access network.

In another embodiment, the one or more parameters include at least one of (i) time of day, (ii) access network conditions, (iii) application type, (iv) level of access network traffic, (v) quality of service level required, (vi) mobile station operational parameters, and (vii) application function operational parameters.

In another embodiment, the policy decision function responds to a request from the application function to establish two or more secondary packet data service instances.

In another aspect, a method of creating a network-initiated secondary packet data service instance includes sending a content request for application data from a mobile station to an application function through an access network, sending a request for enhanced quality of service from the application function to a policy function and evaluating the request for enhanced quality of service and determining one or more operational attributes from the evaluation. The method further includes creating the secondary packet data service instance for the application function to the mobile station by arranging one or more network components as a function of the one or more operational attributes, and transmitting the application data from the application function to the mobile station via the secondary packet data service instance.

In one embodiment, the one or more operational attributes includes a requirement for enhanced quality of service. In another embodiment, the application function includes an application server. In yet another embodiment, the policy function includes a policy server.

One embodiment further includes establishing communication between the mobile station and the access network through a radio access network. In another embodiment, the secondary packet data service instance is characterized by a predetermined quality of service level. This quality of service level is predetermined by the requirements and the specific characteristics of the data source or application sending data via the secondary packet data service instance.

Another embodiment includes evaluating the request from the application function and creating the secondary packet data service instance based on at one or more parameters relating to the mobile station, the application function, and the access network. The one or more parameters may include at least one of (i) time of day, (ii) access network conditions, (iii) application type, (iv) level of access network traffic, (v) quality of service level required, (vi) mobile station operational parameters, (vii) application function operational parameters, among others.

Another embodiment includes creating two or more secondary packet data service instances on behalf of the application function to the mobile station, by arranging one or more network components as a function of the one or more operational attributes.

Another aspect is a system for creating a network-initiated secondary packet data service instance. The system includes an access network for connecting one or more network components, and a mobile station in communication with the access network through a wireless connection. The mobile station has an assigned IP address, and the wireless connection includes a radio access network and a broadband remote access server including a gateway GPRS serving node and a serving GPRS serving node. The system further includes an application server for providing content to an application operating on the mobile station. The application server is capable of communicating through the access network. The system also includes a policy server for managing network resources used for communication between the application server and the mobile station. The policy server responds to a request from the application function to establish one or more secondary packet data service instances having a predetermined quality of service level.

Another aspect is a method of creating a network-initiated secondary packet data service instance. The method includes sending a content request for application data from a mobile station to an application server through an access network. The access network includes a radio access network. The method further includes sending a request for enhanced quality of service from the application server to a policy server, evaluating the request for enhanced quality of service, and determining one or more operational attributes from the evaluation. The one or more attributes includes at least a requirement for one or more secondary packet data service instances that have enhanced quality of service. The method also includes creating the one or more secondary packet data service instances, on behalf of the application server, to the mobile station, by arranging one or more network components as a function of the one or more operational attributes. The method also includes transmitting the application data from the application server to the mobile station via at least one of the secondary packet data service instances.

DESCRIPTION OF THE PREFERRED EMBODIMENTS

The following sections provide a detailed description of an embodiment of a system for creating a network-instantiated secondary packet data service instance for an application residing on a mobile station, where the mobile station has already established a connection to the network. The sections following this detailed description discuss several alternative variations of the described embodiment.

Figure 1:
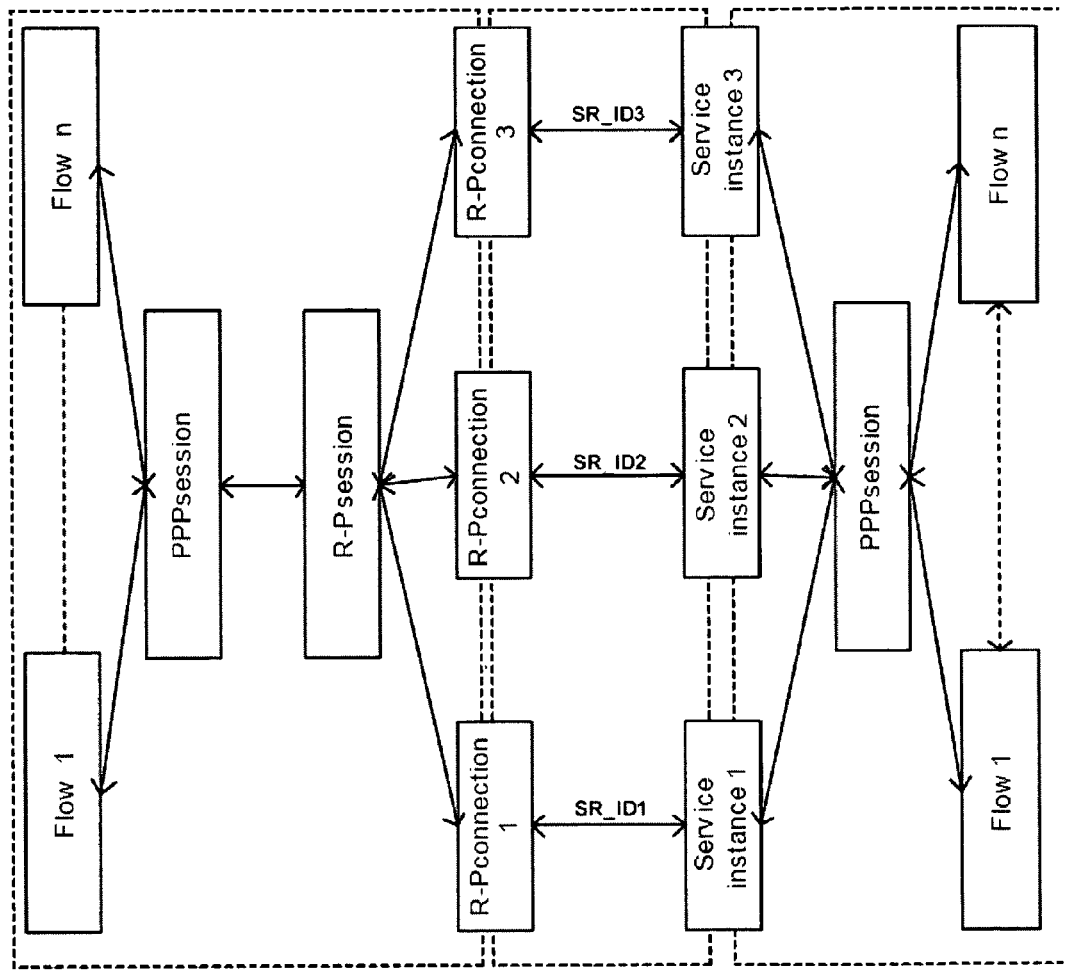
FIG. 1 illustrates an example of three packet data service instances.
Figure 2:
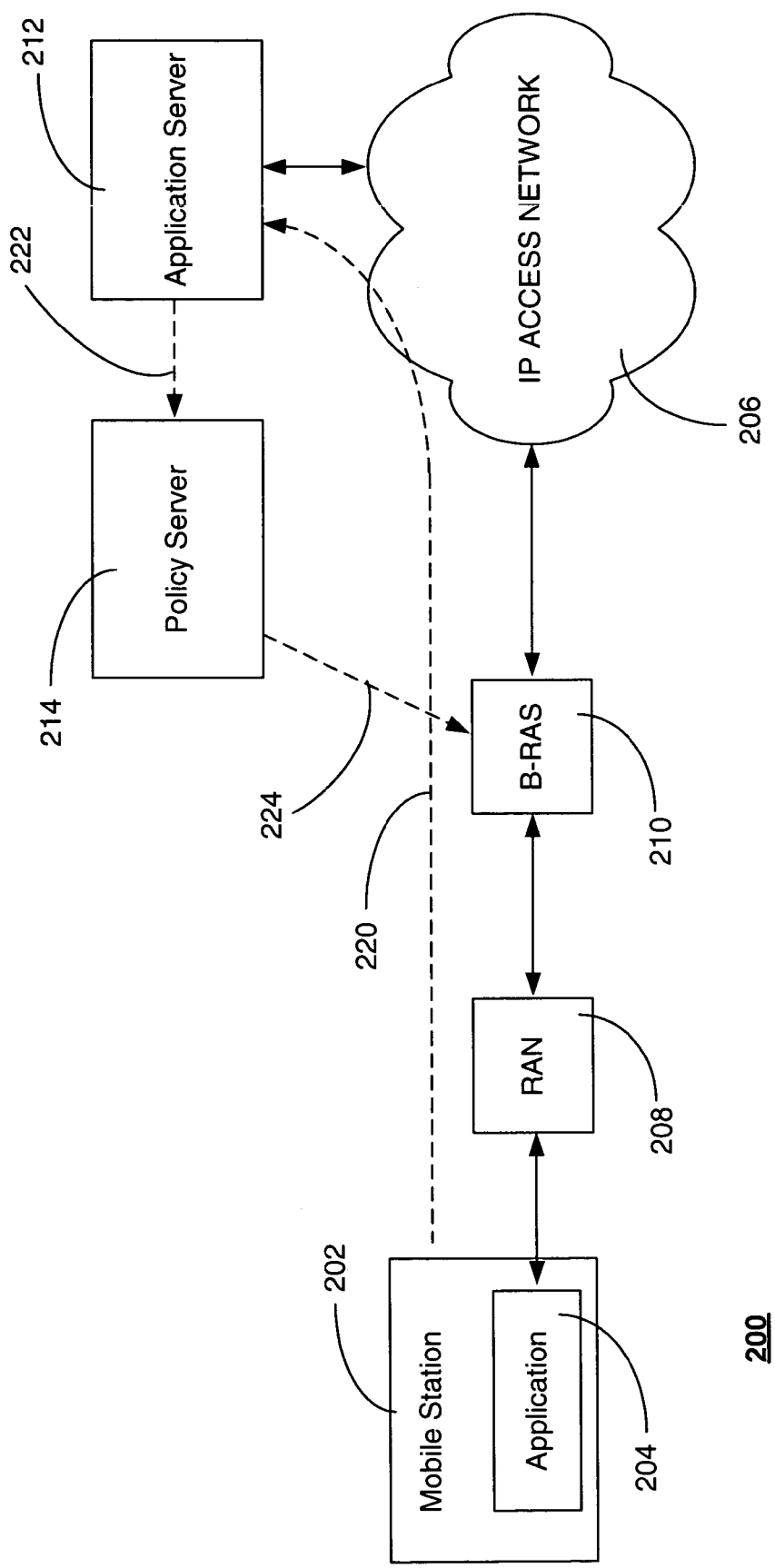
FIG. 2 shows one embodiment of a system for creating a network-initiated secondary packet data service instance.

FIG. 2 shows one embodiment of a system 200 for creating a network-initiated secondary packet data service instance. In this embodiment, a mobile station 202 hosts an application 204 that requires a secondary PDP context (i.e., a secondary packet data service instance) with enhanced QoS. For example, a real-time streaming video player requires better QoS than an e-mail application. This is because significant packet latency could cause interruptions in the video presentation, whereas the e-mail application can simply wait until all packets arrive before presenting the e-mail message. Similarly waiting until the entire video stream arrives is not practical because doing so would require memory resources beyond what the mobile station 202 typically hosts.

In this embodiment, the mobile station 202 is already attached to the access network 206 through a Radio Access Network (RAN) 208 and a Broadband Remote Access Server (B-RAS) 210, and therefore has an assigned IP address. The system 200 also includes an application server 212 that hosts content (e.g., video data) that can be run by the application 204. The system 200 further includes a policy server 214 that provides fine control over how network resources should be utilized across various applications and subscribers.

The policy server 214, functioning as the higher-level intelligence in the network 206, decides if and when to create the secondary packet data service instance with the appropriate QoS attributes, in response to a request from a user of the network. In general, the policy server 214 evaluates the user request (through the application server 212) and 'pushes' control information related to this evaluation to the appropriate network elements. Those network elements are then responsible for the actual creation of the secondary packet data service instances and enforcing the QoS attributes for the application media that is flowing through the network elements.

In network architectures defined by 3GPP, this network element is the Gateway GPRS Serving Node (GGSN) that will interact with the Serving GPRS Serving Node (SGSN) and mobile station in order to create a traffic flow on the RAN 208. In the described embodiment, both the GGSN and the SGSN exist within the B-RAS 210. In network architectures defined by 3GPP2, this network element is a Packet Data Serving Node (PDSN)/Home Agent that will then interact with the Packet Control Function (PCF) or Access Network Function in order to create the secondary packet data service instance on the RAN 208.

The policy server 214 enables fine control over network resource usage based on operational parameters and attributes such as the time of day, access network conditions, application type, level of access network traffic, quality of service level required to convey the requested data, operational parameters associated with the mobile station, and operational parameters associated with the application function, among others. The policy server 214 performs admission control functions in addition to pushing QoS policies down to the appropriate network elements. The policy server 214 keeps track of sessions that have been admitted relative to the physical network topology, and enables the service provider (e.g., the application server 212) to control how much traffic is admitted over the various network elements.

The operation of policy server 214 has been described in detail in U.S. patent application Ser. No. 10/867,157, entitled "Dynamic Service Delivery Platform for Communication Networks," filed Jun. 14, 2004, which is hereby incorporated herein by reference in its entirety.

Refer again to FIG. 2 for an overview of general operation of the described embodiment. For the purposes of this description, it is assumed that the mobile station 202 is currently connected to the network 204 through a primary packet data service instance, and therefore already has an IP address established. The system 200 initiates a network-instantiated secondary packet data service instance when the application 204 sends a request 220 to the application server 212. The request 220 propagates through the RAN 208, the B-RAS 210 and the access network 206 before it reaches the application server 212. The application server 212 then signals the policy server 214 with a request 222 to send application data to the mobile station 202 with an enhanced QoS context. The policy server 214 evaluates the request from the application server 212, and if appropriate, provides signaling information 224 to the access network 204 directing the relevant components of the access network 204 to establish the a secondary packet data service instance between the mobile station 202 and the application server 212.

A specific procedure for establishing Secondary PDP Context (an secondary packet data service instance) in a UMTS network is set forth in 3GPP standard TS 23.060 3rd Generation Partnership Project; Technical Specification Group Services and System Aspects; General Packet Radio Service (GPRS); Service description; Stage 2. The procedure is shown graphically in the FIG. 3. Acronyms and detailed descriptions of the procedural elements can be found in the 3GPP standard.

Figure 3:
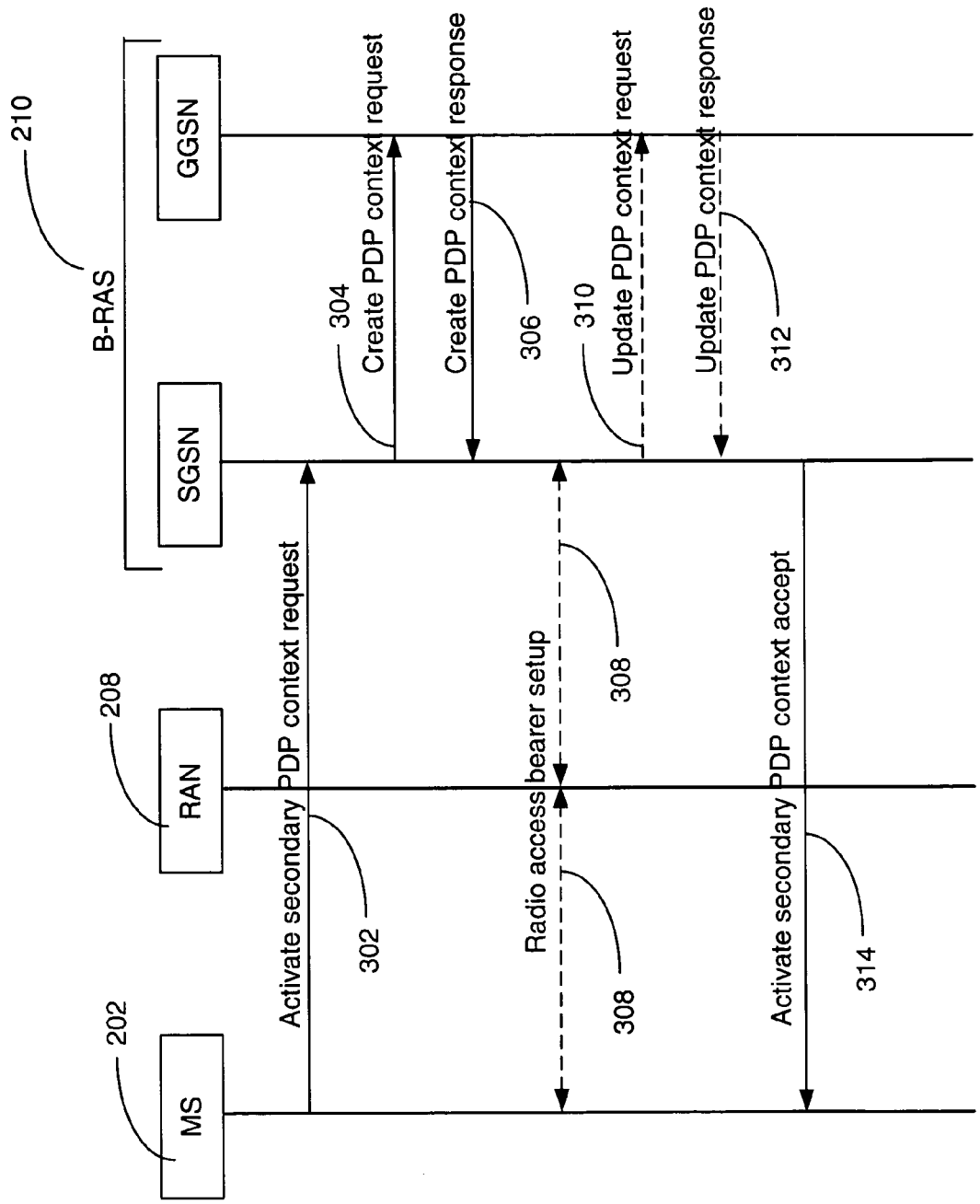
FIG. 3 illustrates a specific procedure for establishing Secondary PDP Context (an secondary packet data service instance) in a UMTS network.

FIG. 3 describes the current art that involves the client 'pulling' for QoS from the network. When an application on the mobile station 202 determines that it wants to receive application data from a resource on the network (e.g., an application server), the application via the mobile station sends a PDP context request 302 to the SGSN in the B-RAS device 210 to establish a secondary packet data service instance. The SGSN relays this request 304 to the GGSN, which may optionally authorize and complete the establishment of the secondary packet data service instance. If the network agrees to support a secondary packet data service instance, the GGSN passes a response 306 from the network to the SGSN, and the SGSN instructs the RAN and the mobile station 202 to execute the necessary signaling 308 to establish the secondary context. The network and the B-RAS exchange update requests and responses 310, 312, respectively, to complete the secondary PDP context, and the B-RAS acknowledges 314 to the RAN and the mobile station 202 that the secondary packet data service instance has been established. The SGSN then routes the appropriate data packets from the network onto the secondary packet data service instance.

The described embodiment adds a "push mode" to the procedures described in the standards and in FIG. 3. Although the technical requirements to implement this change are minimal, there are a large number of benefits to this "push model."

Figure 4:
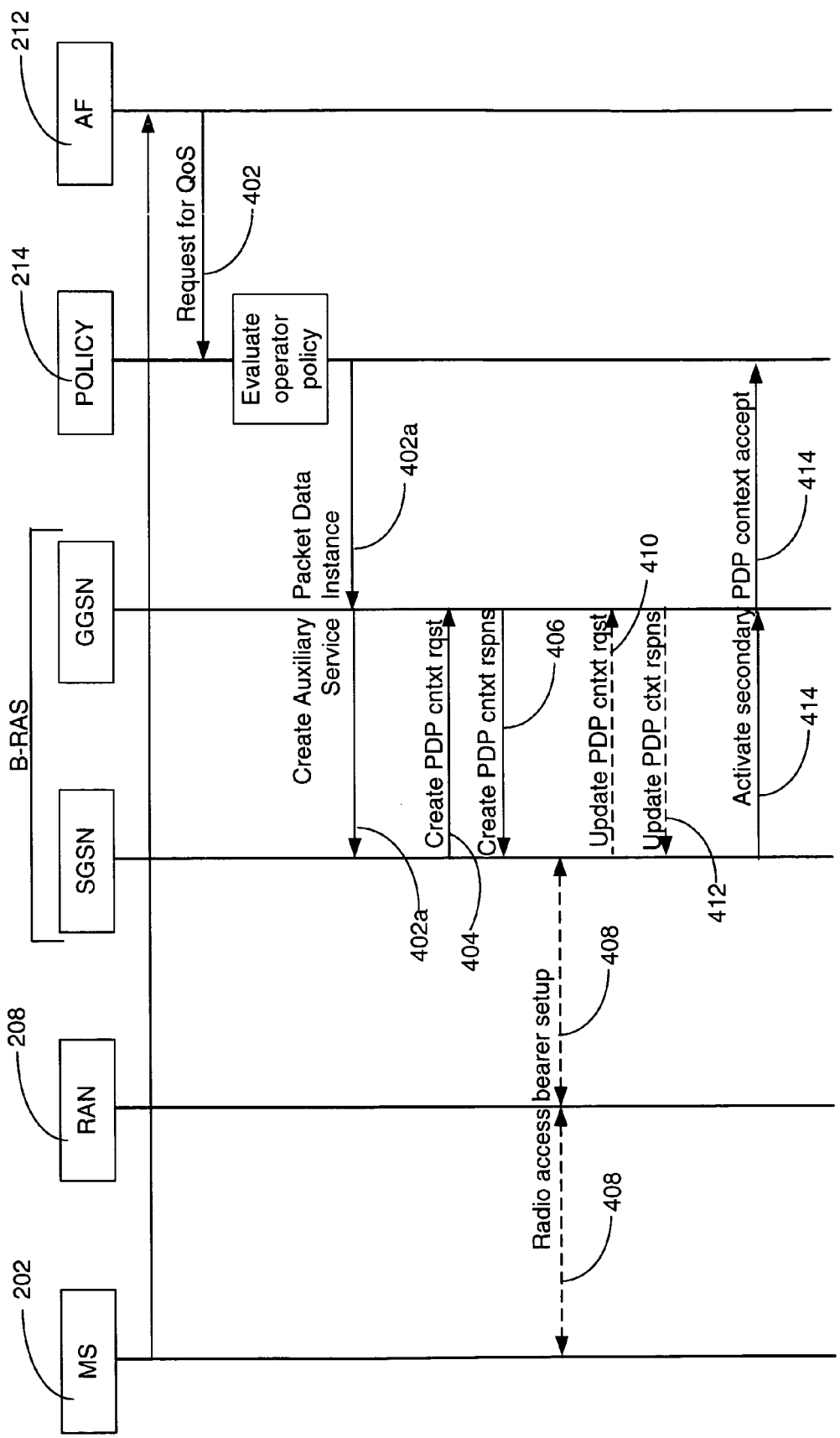
FIG. 4 illustrates a push model of the procedure shown in FIG. 3, according to the present invention.

In the "push model," shown graphically in FIG. 4, an application 204 on a mobile station 202 interacts with a QoS aware Application Function (AF—such as the application server 212) through the RAN 208, the B-RAS 210 and the access network, to request application data (i.e., application content). The AF 212 submits a request 402 for special QoS characteristics based on the requirements of the application 204. The request 402 from the AF 212 is sent to the policy server 214, which evaluates the request based on a number of subscriber, network, and application criteria. Based on the policy of the network operator, the capabilities of the network, and mobile station, in one embodiment the Policy Server 214 signals 402a the GGSN and SGSN (i.e., the B-RAS) to create the secondary flow with the requested Quality of Service and operational attributes. These operational attributes define characteristics of the secondary packet data service instance needed by the application or data source that will utilize the secondary data service instance. This signaling 402a is analogous to the request 302 from the mobile station shown in FIG. 3. The following five communications shown in FIG. 4 (i.e., 404, 406, 408, 410 and 412) are same as communications 204, 206, 208, 210 and 212, respectively, from FIG. 3 with the slight modifications required for network initiation. These communications function to establish the secondary packet data service instance for the application 204 between the application 204 and the AF. The final communication 414 is analogous to the acknowledgement 314 in FIG. 3, except that in FIG. 4 the acknowledgement 414 passes through the GGSN to the Policy Server 214. Thus, the policy server 214 receives the acknowledgement that the secondary packet data service has been established, rather than the mobile station 202.

Both 3GPP and 3GPP2 currently employ similar mechanisms for the establishing a secondary packet data service instance (pull model). The described embodiment applies to both 3GPP and 3GPP2 based network, as well as other networks. The details of the implementation and protocols used between 3GPP and 3GPP2 may be different but the basic concept of the 'push' model is novel in both architectures.

The main advantage of the 'push' model is that it enables the network operator to deploy new applications with Quality of Server (ensuring a premium end user experience and application performance assurance) without having to rely on specialized software running on the clients that can initiate the request for secondary flows when the application session is initiated. This enables any application to be delivered with QoS to generic end points that do not support special signaling protocols to request for the secondary packet data service instances. In addition, the 'network initiated' model adds enhanced security to the network, and also provides enhanced revenue opportunities to the network operator by facilitating the rollout of differentiated QoS enabled services. The push model described herein may be used to update an existing secondary packet data service instance, as well as creating a new secondary packet data service instance.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for creating a network-initiated secondary packet data service instance, said system comprising:
an application server system configured to implement a quality of service (QoS) aware application function for providing application content data to an application operating on a mobile station having an assigned IP address and connected to an access network through a primary packet data service instance, wherein the application function is capable of communicating through the access network, and wherein the application function is configured to receive, from the application on the mobile station, a request for the application content data and, in response to the request for application content data, for generating a request for quality of service characteristics based on the requirements of the application on the mobile station; and
a policy server for receiving the request for QoS characteristics from the application function and for signaling the access network directing components of the access network to establish a secondary packet data service instance with QoS requested by the application function between the mobile station and the application function.

2. The system of claim 1, wherein the wireless connection includes:
(i) a radio access network; and
(ii) a broadband remote access server, including a gateway GPRS serving node and a serving GPRS serving node.

3. The system of claim 1, wherein the policy server is configured to manage network resources to create the secondary packet data instance on behalf of the application function.

4. The system of claim 3, wherein the secondary packet data service instance is characterized by a predetermined quality of service level.

5. The system of claim 3, wherein the policy decision function is configured to evaluate the request from the application function and order the creation of the secondary packet data instance based on one or more parameters relating to the mobile station, the application function, and the access network.

6. The system of claim 5, wherein the one or more parameters include at least one of (i) time of day, (ii) access network conditions, (iii) application type, (iv) level of access network traffic, (v) quality of service level required, (vi) mobile station operational parameters, and (vii) application function operational parameters.

7. The system of claim 1, wherein the policy decision function is configured to respond to a request from the application function to establish two or more secondary packet data service instances.

8. The system of claim 1, wherein the policy server is further configured to signal one or more elements on the access network to establish the secondary packet data service instance over the access network.

9. The system of claim 1, wherein the policy server is further configured to signal a remote access server to establish the secondary packet data service instance over the access network.

10. The system of claim 9, wherein the policy server is further configured to receive from the remote access server an acknowledgement that the secondary packet data service instance has been established.

11. A method implemented by a policy server to create a network-initiated secondary packet data service instance, said method comprising:
receiving, at a policy server, a request for enhanced quality of service from an application server implementing a quality of service (QoS) aware application function, wherein the request is sent by the application server in response to the application server receiving a content request for application data from a mobile station connected to an access network via a primary packet data service instance, wherein the request generated by the application function based on requirements of an application on the mobile station;
evaluating, at the policy server the received request for enhanced quality of service and determining one or more operational attributes from the evaluation; and
generating, at the policy server, signaling for establishing a secondary packet data service instance from the application function to the mobile station, the signaling directing components of an access network to establish the secondary packet data service instance with the QoS requested by the application function.

12. The method of claim 11, wherein the one or more operational attributes includes a requirement for enhanced quality of service.

13. The method of claim 11, further comprising receiving from the one or more network components an acknowledgement that the secondary packet data service instance has been established.

14. The method of claim 11, wherein the secondary packet data service instance is characterized by a predetermined quality of service level.

15. The method of claim 11, further including evaluating the request from the application server and creating the secondary packet data service instance based on at one or more parameters relating to the mobile station, the application function, and the access network.

16. The method of claim 15, wherein the one or more parameters include at least one of (i) time of day, (ii) access network conditions, (iii) application type, (iv) level of access network traffic, (v) quality of service level required, (vi) mobile station operational parameters, and (vii) application function operational parameters.

17. The method of claim 11, further including creating two or more secondary packet data service instances on behalf of the application function to the mobile station by arranging one or more network components as a function of the one or more operational attributes.

18. The method of claim 11, further comprising receiving from the remote access server an acknowledgement that the secondary packet data service instance has been established.

19. A system for creating a network-initiated secondary packet data service instance, said system comprising:
an application server implementing a quality of service (QoS) aware application function for providing application content data to an application operating on a mobile station having an assigned IP address and connected to an access network through a primary packet data service instance, wherein the application server is capable of communicating through an access network, and wherein the application function is configured to receive, from the application on the mobile station, a request for the application content data and, in response to the request for application content, for generating a request for quality of service characteristics based on the requirements of the application on the mobile device;
a policy server for receiving the request from the application function, for evaluating the request and for signaling the access network directing components of the access network to establish a secondary packet data service instance with QoS requested by the application function between the mobile station and the application server.

20. A method implemented by a policy server for providing content to the mobile station over the network, said method comprising:
receiving, at a policy server, a request for enhanced quality of service from an application server implementing a quality of service (QoS) aware application function, wherein the request is sent by the application function in response to the application function receiving a content request for application data from an application on a mobile station connected to an access network via a primary packet data service instance and wherein the request for enhanced quality of service is based on requirements of the application on the mobile station;
evaluating, at the policy server, the received request for enhanced quality of service and determining one or more operational attributes from the evaluation, including a requirement for one or more secondary packet data service instances having enhanced quality of service;
generating signaling for establishing the one or more secondary packet data service instances with the QoS requested by the application function; and
sending, from the policy server, the signaling for establishing the one or more secondary packet data service instances to a remote access server system to create the one or more secondary packet data service instances, on behalf of the application server, to the mobile station, by arranging one or more network components as a function of the one or more operational attributes.

21. The method of claim 20, further comprising receiving from the remote access server an acknowledgement that the one or more secondary packet data service instances has been established.

22. A system for use on an access network over which an application server implementing a quality of service (QoS) aware application function provides content to a mobile station to which an IP address has been assigned, said system comprising:
a policy server system configured to implement a policy enforcing function for managing network resources used for communication between the QoS aware application function and the mobile station over the access network, wherein the mobile station is connected to the access network through a primary packet data service instance, wherein the policy enforcing function is configured to:
(i) respond to a request from the QoS aware application function for enhanced quality of service generated by the application function based on requirements of an application in the mobile station, wherein the request is sent by the application function in response to the application function receiving a request from the mobile station for application content data hosted by the application function;
(ii) to evaluate the received request for enhanced quality of service based on the requirements and determine from the evaluation one or more operational attributes; and
(iii) create signaling for establishing a secondary packet data service instance with QoS requested by the application function and sending the created signaling to a remote access server system to create the secondary packet data service instance for the application server to the mobile station by arranging one or more network components as a function of the one or more operational attributes.

* * * * *